United States Patent [19]

Tadokoro et al.

[11] 4,101,948
[45] Jul. 18, 1978

[54] METHOD FOR CLEANING FLEXIBLE MAGNETIC DISCS

[75] Inventors: Eiichi Tadokoro; Tatsuji Kitamoto, both of Odawara, Japan

[73] Assignee: Fuji Photo Film Co., Ltd., Minami-ashigara, Japan

[21] Appl. No.: 753,165

[22] Filed: Dec. 21, 1976

[30] Foreign Application Priority Data

Dec. 29, 1975 [JP] Japan .................. 51-159260

[51] Int. Cl.$^2$ .................. B21B 45/02; G11B 25/04
[52] U.S. Cl. .................. 360/137; 15/230.14; 15/256.5; 274/47
[58] Field of Search ............ 274/47; 15/256.5, 230.14, 15/230.11; 360/137

[56] References Cited

U.S. PATENT DOCUMENTS

| | | | |
|---|---|---|---|
| 3,346,903 | 10/1967 | Darak | 15/230.14 |
| 3,366,390 | 1/1968 | Applequist | 15/256.5 |
| 3,668,658 | 6/1972 | Flores | 274/47 |
| 3,945,647 | 3/1976 | Rangabe | 15/256.5 |
| 3,992,018 | 11/1976 | Plummer | 15/256.5 |
| 4,001,892 | 1/1977 | Castelli | 360/137 |

*Primary Examiner*—Jay P. Lucas
*Attorney, Agent, or Firm*—Sughrue, Rothwell, Mion, Zinn and Macpeak

[57] ABSTRACT

A soft, coarse, porous cleaning sheet 32 is adhered to the upper surface of a flat horizontal base plate 2, and has approximately the same configuration as the base plate. A floppy record disc 9 having a magnetic layer 10 is secured to the spindle 6 of a motor 5, and when the disc is rotated at a "below levitation" speed the layer 10 slidingly engages the cleaning sheet 32 and is scrape dusted clean thereby.

16 Claims, 2 Drawing Figures

METHOD FOR CLEANING FLEXIBLE MAGNETIC DISCS

BACKGROUND OF THE INVENTION

1. Field of the Invention

The present invention relates to a method for cleaning flexible magnetic record discs.

2. Description of the Prior Art

The term magnetic records as used herein refers to those obtained by applying a magnetic coating on one or both surfaces of a flexible, non-magnetic support, such as a polyethylene terephtalate or cellulose triacetate film from 10 to 50 $\mu$ thick, and thereafter trimming the coated support into a "doughnut" shape having an inside diameter of from 0.5 to 3 cm and an outside diameter of from 10 to 50 cm.

Magnetic records of this type are generally referred to as "floppy" or self-levitating records. In use, the center hole of such a record is placed over the end of and secured to the rotary shaft of a magnetic recording and reproducing device. As the shaft rotates the record horizontally and centrifugally levitates to assume a substantially rigid, planar configuration, whereby magnetic recording and reproduction may be implemented by a magnetic head proximate the surface of the record.

Typically, such records are subject to the phenomenon known as "dropout", which is a rapid reduction in output level for a short period of time due to dust adhering to the surface of the magnetic layer; dropout is particularly pronounced or noticeable in the reproduction of stationary images. It is therefore important to keep the surface of the magnetic layer clean in order to obtain a stable reproduction output.

In order to discuss a widely used prior art cleaning method, a conventional recording and reproducing apparatus for flexible magnetic discs will first be described. Referring to FIG. 1, a recorder/reproducer 1 comprises a base plate 2 having a center hole 3 and an elongated, radial slot 4 spaced from the center hole. A motor 5 disposed below the base plate has a rotary shaft 6 extending through the center hole 3 and protruding above the base plate. A cap 7 is screwed onto the upper end of the shaft 6, and a magnetic head 8 extends up through the slot 4. A magnetic record or disc 9 is arranged so that the surface of a magnetic layer 10 formed on a flexible support 11 is opposite the upper surface of the base plate 2. The upper end of the shaft 6 is inserted into a center hole 9a in the disc, and the cap 7 is screwed onto one shaft to clamp the disc thereto. The motor 5 rotates the shaft 6 in the direction of arrow A at 900 to 3600 r.p.m. to centrifugally levitate the disc 9 with a normal clearance H of from 50 to 2,000 $\mu$ between the surface of the magnetic layer 10 and the upper surface of the base plate 2. The arrow C designates air drawn up or blown up through the center hole 3, and thrown spirally outwardly in the gap H by centrifugal force due to its frictional adherence to the magnetic layer 10.

To clean the disc, the magnetic head 8 is extended upwardly through the slot 4 until its upper surface comes into contact with the surface of the magnetic layer 10. The head is then moved radially in the direction of arrow B so that the entire recording area of the layer 10 slidably contacts the upper surface of the head 1, whereby harmful dust adhering to the surface of the disc is tranferred onto the upper surface of the head 8 or scraped off thereby to cleam the disc.

This prior art cleaning method suffers from the following disadvantages, however:

(1) Since the entire recording area of the disc is brought into sliding contact with the magnetic head 8 in the cleaning operation, the upper surface of the head 1 is rapidly worn down and its service life is thus materially reduced.

(2) As the upper surface of the head 8 is normally made of a very hard material, the dust induces push-scars, frictional scars, and scoring in the surface of the magnetic layer 10, which degrades the recording and reproducing quality thereof.

(3) The upper surfce of the magnetic head 8 is generally quite narrow, resulting in a low cleaning efficiency.

SUMMARY OF THE INVENTION

It is therefore an object of the present invention to provide a method for cleaning flexible magnetic discs in a simple and accurate manner, while overcoming the disadvantages noted above with the respect to the prior art.

According to the present invention, a cleaning sheet is disposed on and adhered to the upper surface of the base plate of a magnetic recording and reproducing apparatus, between the base plate and a flexible record secured to a drive motor shaft. The cleaning sheet is made from a soft, coarse, and porous material, such as a non-woven fabric. When the record is rotated or spun up at a relatively slow speed, the surface of the magnetic layer slides along the upper surface of the cleaning sheet, and dust deposited on the surface of the magnetic layer is efficiently and effectively transferred to the cleaning sheet.

DESCRIPTION OF THE PREFERRED EMBODIMENT

Figure 1:
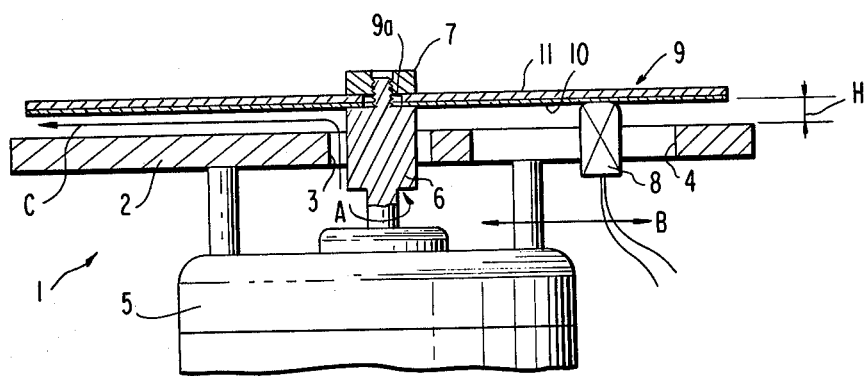
FIG. 1 illustrates a conventional record cleaning method and apparatus.
Figure 2:
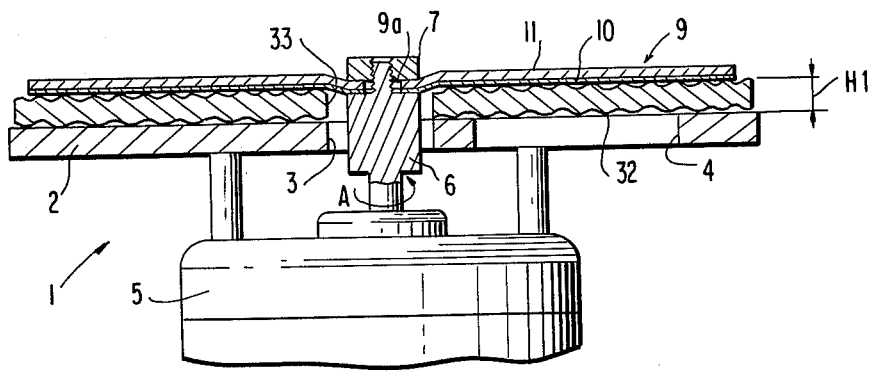
FIG. 2 illustrates a record cleaning method and apparatus in accordance with the present invention.

Referring to FIG. 2, like reference numerals have been used to designate the same structural elements shown in FIG. 1. The magnetic head 8 has been eliminated, however, and instead a cleaning sheet 32 is secured to the upper surface of the base plate 2 by adhesive tape or other suitable means.

The cleaning sheet 32 may comprise a non-woven cloth whose overall height $H_1$ is approximately equal to the spacing H shown in FIG. 1, and is formed with a center hole 33 having substantially the same diameter as that of the center hole 3 of the base plate. The outside diameter of the sheet 32 is cut off so as to have substantially the same outside diameter as the disc 9.

In operation, the disc 9 is placed over the cleaning sheet 32 such that the surface of the magnetic layer 10 is opposite the upper surface of the cleaning sheet, after which the disc 9 is secured to the upper end of the rotary shaft 6 by the cap 7. The disc 9 is then rotated at 60 to 1800 r.p.m. in the direction of arrow A and for 20 seconds to 10 minutes, and the recording surface of the magnetic layer 10 slidingly contacts the upper surface of the cleaning sheet 32. As a result of such contact, the dust deposited on or adhering to the surface of the magnetic layer 10 is gradually transferred to and collected on the relatively soft, porous, and coarse surface of the cleaning sheet 32, whereby the surface of the magnetic layer becomes thoroughly cleaned without inducing any harmful frictional scarring, push-scarring, or scoring.

If the disc is rotated too fast it tends to levitate and separate from the cleaning sheet 32, and hence the cleaning operation is interrupted. If the speed is gradually decreased, however, as by interrupting the power to the motor 5, the disc returns to its sliding contact with the upper surface of the cleaning sheet 32, whereby the cleaning continues until the rotary shaft 6 is completely stopped.

After a cleaning cycle has been completed as described above, the disc 9 and the cleaning sheet 32 are removed from the shaft 6 and the base plate 2, respectively, and the disc 9 is then replaced on the shaft, whereby magnetic recording or reproduction is ready to begin.

The cleaning sheet 32 is not limited to a non-woven fabric as mentioned above, as long as the material thereof is relatively soft, coarse and porous. For example, sheets made of felt, polytex, Japanese paper, or sponge may also be used. However, in order to prevent the erratic rotation of the disc 9 due to the attraction of static electricity, it is preferable to select materials which are difficult to electrically charge, or to coat the surface of the cleaning sheet with a metallic powder, fluorocarbon, molybdenum disulfide, tungsten disulfide, talc powder, etc. to prevent any charging.

If the overall height $H_1$ of the cleaning sheet is slightly greater than H in FIG. 1, whereby the central portion of the mounted disc (inside the holes 3, 33) is concave as shown in FIG. 2, as long as no permanent strains or creases are formed in the disc, the levitation effect is retarded to thereby increase the overall cleaning effect.

If, on the other hand, the height $H_1$ is less than H in FIG. 1, complete cleaning can still be obtained if the cleaning time is increased. If the cleaning effect is unstable due to the non-uniformity of the cleaning sheet 32, the surfaces of the cleaning sheet may be embossed to provide a uniform concave-convex finish, as generally illustrated in FIG. 2. If the cleaning sheet is embossed, however, the overall height $H_1$ thereof should be maintained at the value described above, i.e. $H_1 \cong H$.

If the cleaning sheet is wide enough to cover the entire effective recording and reproducing area of the disc, the shape thereof is not limited to a circle but may also include square, rectangular, or elliptical configurations.

Furthermore, the cleaning sheet may still be used even if the upper surface of the base plate contains some irregularities, such as semicircular or spherical convexities. In such cases, the flexibility of the disc allows it to bend around or over and conform to such irregularities, whereby thorough cleaning is still achieved.

As developed above, the cleaning technique of the present invention affords the folowing benefits and advantages:

(1) When the cleaning sheet 32 is adhered to the surface of the base plate 2, and the disc 9 is rotated at a sufficiently low speed so that no significant levitation occurs, the magnetic layer 10 is placed in sliding contact with the upper surface of the cleaning sheet and any dust adhered to the layer 10 is continuously scraped off by and onto the cleaning sheet. The cleaning action is quick and efficient, and does not frictionally scar or push-scar the surface of the magnetic layer.

(2) The dropout phenomenon is materially reduced, the reproduction, particularly of stationary images, is greatly stabilized, and the dust abrasion of the magnetic head is decreased to thereby extend its service life.

(3) The recording and reproducing apparatus itself is utilized to clean the surface of the magnetic layer 10 in an extremely easy and accurate manner, without requiring any special cleaning apparatus or hardware.

What is claimed is:

1. A cleaning method for a recording and reproducing apparatus of the type having a flat, horizontal base plate having a central aperture therein, a drive motor mounted beneath the base plate and having a rotary spindle extending up through the aperture, and a flexible record disc secured to the spindle for levitating rotation thereby parallel to and above the base plate, the record disc having a magnetic layer thereon on the side opposing the base plate, said method for cleaning the magnetic layer comprising:

(a) disposing a soft, coarse, and porous sheet member on the base plate below the record disc, the sheet member having a central aperture therein corresponding to the base plate aperture
 (b) adhering the sheet member to the base plate,
 (c) rotating the record disc at a speed below its levitation speed, whereby the magnetic layer is slidingly contacted by the sheet member and cleaned thereby, dust particles adhering to the magnetic layer being scraped off by and transferred to the sheet member, and
 (d) removing the sheet member prior to recording or reproducing information on or from said disc.

2. A cleaning method as recited in claim 1, wherein the thickness of the sheet member is approximately equal to the spacing between the record disc and the base plate when the record disc is rotationally levitated.

3. A cleaning method as recited in claim 2, wherein the sheet member is made of a non-woven fabric.

4. A cleaning method as recited in claim 2, wherein at least the upper surface of the sheet member is embossed in a concave-convex waffle pattern.

5. A cleaning method as recited in claim 2, wherein the outer configuration of the sheet member defines an area at least as large as that of the record disc, whereby the entire recording surface of the magnetic layer is slidingly contacted by the sheet member.

6. A cleaning method as recited in claim 1, wherein at least the upper surface of the sheet member is embossed in a concave-convex waffle pattern.

7. A cleaning method as recited in claim 1, wherein the outer configuration of the sheet member defines an area at least as large as that of the record disc, whereby the entire recording surface of the magnetic layer is slidingly contacted by the sheet member.

8. A cleaing method as recited in claim 1, wherein the sheet member is made of a non-woven fabric.

9. In a recording and reproducing apparatus of the type having a flat, horizontal base plate having a central aperture therein, a drive motor mounted beneath the base plate and having a rotary spindle extending up through the aperture, and a flexible record disc secured to the spindle for levitating rotation thereby parallel and above the base plate, said record disc having a magnetic layer thereon on the side opposing the base plate, a soft, coarse, porous sheet member disposed on the base plate below said record disc and having a central aperture therein corresponding to and aligned with the base plate aperture and means for releasably adhering the sheet member to said base plate whereby upon rotation of the record disc a speed below its levitation speed the magnetic layer will be disposed in sliding contact with the sheet member and be cleaned thereby.

10. In a recording and reproducing apparatus as set forth in claim 9, wherein the thickness of the sheet member is approximately equal to the spacing between the record disc and the base plate when the record disc is rotatably levitated.

11. In a recording and reproducing apparatus as set forth in claim 10, wherein at least the upper surface of the sheet member is embossed in a concave-convex waffle pattern.

12. In a recording and reproducing apparatus as set forth in claim 10, wherein the outer configuration of the sheet member defines an area at least as large as that of the record disc, whereby the entire recording surface of the magnetic layer is slidingly contacted by the sheet member.

13. In a recording and reproducing apparatus as set forth in claim 10, wherein the sheet member is made of a non-woven fabric.

14. In a recording and reproducing apparatus as set forth in claim 9, wherein at least the upper surface of the sheet member is embossed in a concave-convex waffle pattern.

15. In a recording and reproducing apparatus as set forth in claim 9, wherein the outer configuration of the sheet member defines an area at least as large as that of the record disc, whereby the entire recording surface of the magnetic layer is slidingly contacted by the sheet member.

16. In a recording and reproducing apparatus as set forth in claim 9, wherein the sheet member is made of a non-woven fabric.

* * * * *